May 19, 1942.    F. G. S. WHITFIELD ET AL    2,283,837
FILING DEVICE FOR PHOTOGRAPHIC NEGATIVES AND THE LIKE
Filed May 20, 1940
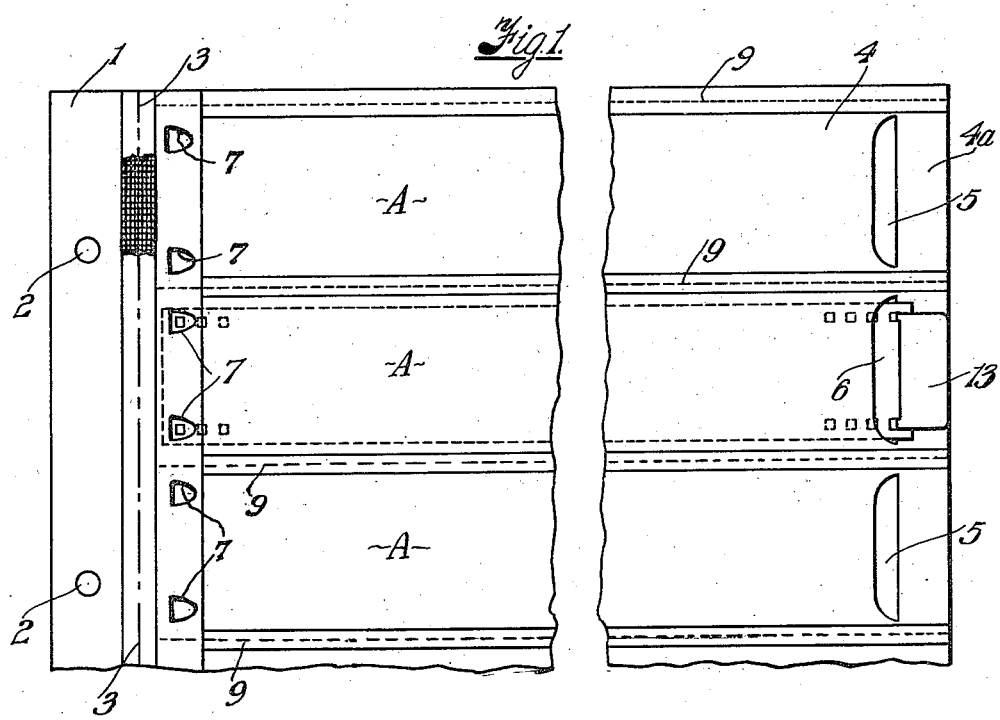
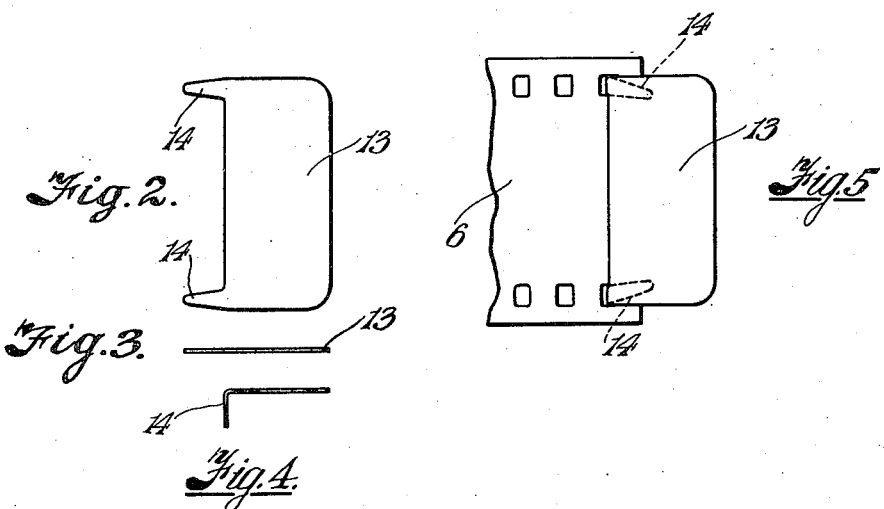
INVENTORS
Frank Graham Saril Whitfield
Cuthbert Jack Golledge
By Norris & Bateman
ATTORNEYS Patented May 19, 1942

2,283,837

UNITED STATES PATENT OFFICE 2,283,837

FILING DEVICE FOR PHOTOGRAPHIC NEGATIVES AND THE LIKE

Frank Graham Sarel Whitfield and Cuthbert Jack Golledge, London, England

Application May 20, 1940, Serial No. 336,298
In Great Britain June 27, 1939

1 Claim. (Cl. 40—20)

This invention relates to improvements in filing devices for photographic negatives and the like, and has for its object a systematic means for filing, recording and tabulating same, wherein a principle akin to a loose leaf ledger or indexing cabinet is applied for storage, ready reference, abstraction and refiling.

In many research laboratories and industrial organisations it has become customary to record data, biological records, documents and the like photographically and for such purpose to employ micro film which can be stored for reference in the minimum of space. Such films are of a standard size such as 35 mm. and the supplies of such material and cameras therefor can be obtained in every quarter of the globe. Such films to suit use in a variety of cameras have perforate edgings which also are standard for the feeding devices of cinematograph cameras and projectors and of 35 mm. still, i. e. non motion cameras and film slide projectors. The usual method of storage of such negatives to-day is to place them in lengths varying from a foot or so to 100 feet or more in tinned steel canisters, which are sealed by a removable cover. This method has many drawbacks for quick reference, besides the fact that the canisters readily deteriorate both externally and internally and in some climates sweat, and are apt to destroy the records which they are intended to preserve, and the removal of long lengths of film from such canisters involves inevitable scratching of the film during the process of rolling and unrolling.

The present invention overcomes the above disadvantages and consists in the provision of storage and indexing devices for photographic films and the like, and comprises a plurality of loose leaves capable of being assembled in an appropriate binder therefor and/or in a suitable steel cabinet, each of said leaves being constructed with a series of pockets arranged in parallel relationship and formed from transparent, translucent or opaque material with or without a pocket cover wholly or in part transparent or translucent, the said covers having finger notches for assistance in insertion and removal of film strip and metallic tabs formed with bendable lugs for attachment to said film, the said pockets and said tabs having means for individual marking for indentification, reference and indexing.

The invention further comprises means for the economic production of an assembly of pockets upon a leaf as by making the normal sheet twice the length, slotting the extension length to make pocket mouths and finger notches, bending the extension length back upon the base length and constructing the pockets in parallel relationship the one to the other by line stitching, sewing or by applying an adhesive or by other equivalent means at preferably regular intervals across the width of the sheet.

Alternatively instead of dividing a double length sheet the base sheet may be covered by a sheet of substantially the same dimensions but of a like or differing character. Thus the base sheet may be opaque, whilst the cover sheet may be transparent or translucent. Again the cover sheet may have translucent or transparent windows or windows without a covering, the said cover sheet being attached to the base sheet in the like manner to that described above.

In order that the invention may be better understood, reference is made to the accompanying drawing wherein a preferred construction of the invention is illustrated, and wherein:

Fig. 1 is a fragmentary view of a portion of a filing device having a photographic film inserted therein, Fig. 2 is a plan view of a blank from which a tab for the film may be formed.

Fig. 3 is an edge view of the blank shown in Fig. 2.

Fig. 4 is an edge view of the tab after it has been formed.

Fig. 5 shows the tab in position.

Referring to the drawing and to Fig. 1 the base sheet 1 is formed from any convenient material and may be of a transparent, translucent or opaque character. It is cut to size and punched with holes or slots 2 for binding on a pillar or other type of loose leaf binder cover. Preferably the said base sheet is creased as at 3 to provide a hinge and the point of the crease may be reinforced by canvas or other suitable material. The face of the sheet 1 in the form shown in the drawing is overlain with a cover sheet 4 to form pockets A, said sheet 4 prior to superimposition, is slotted as at 5 to provide a mouth for entry of the film 6 and further to allow a finger grip for complete insertion or ready extraction of the film. The base of the pocket may be provided with slots 7 which are arranged to be in alignment with the feed slots of normal cinematograph film. The sheet so cut is applied to the surface of the base sheet and caused to adhere thereto by sewing as at 9, or in any other manner which will cause a series of pockets A to be constructed over the base sheet 1 in parallel relationship. The cover sheet 4 may be made from transparent, translucent or opaque material. The cover sheet 4 is also preferably pasted or caused to adhere to the base sheet 1 along the front, back and side edges of the sheet to ensure that no separation takes place during constant use or prolonged storage. The anchorage of the cover sheet 4 to the part 4a adjacent the mouth is important in such connection.

In order to assist the film 6 to be inserted in the pocket without the film surface being touched by hand, the film according to the present invention is provided with a tab of the type illustrated at 13, see Figs. 2 to 5, said tab being made from a metal blank provided with lugs 14 as shown in Figs. 2 and 3, the lugs being bent as shown in Fig. 4. This tab is coated preferably with a white or other coloured surfacing material capable of taking ink or gums, and in applying the same to the film the lugs 14 are placed into the terminal feed slots of the film as shown in Fig. 5 and bend backwards, the front appearance of the tab when so applied being as shown in Fig. 1. If a film is employed wherein no feeding slots are provided, the lugs 14 may be placed through the film at right angles to either edge and secured in position as indicated above.

The cover sheet 4 is arranged with lines for writing the references and for applying other data to the surface of each pocket. Equally each pocket is numbered and the number appears together with binder and envelope numbers on each tab.

In operation of the invention the user is provided with a plurality of leaves and a binder, the latter having an index and/or a special metal cabinet to house the envelopes with or without binder, and as the records are available they are inserted in the pockets, the tabs applied and the particulars of the photographic film entered both in the index and on the face of each pocket. By these means even if several films are removed, their replacement in the appropriate pocket is an extremely simple matter, as a definite number of pockets is constructed on each leaf of paper and the pages are numbered. Further, by indexing the subject matter, a series of films of varying position in the loose leaf bound volume may be immediately found and extracted.

In the manner above described a large number of records may be housed with certainty of reference in a very small space. Thus, assuming that it is necessary to take records of a series of drawings, each representing an individual photograph, ten such photographs can be mounted within a pocket in a length not exceeding 8", so that on a quarto page sixty records are capable of being stored.

We claim:

In a filing device, a photographic film or the like having matched perforations at opposite lateral edges thereof, a flat member of bendable material of a length substantially equal to the width of a film, and having a bendable, laterally directed prong at each end thereof, said prongs being inserted in a pair of matched perforations of said film and bent over so as to form a rigidly connected identifying tab for said film.

FRANK GRAHAM SAREL WHITFIELD.
CUTHBERT JACK GOLLEDGE.